United States Patent [19]

Carter

[11] 4,216,948
[45] Aug. 12, 1980

[54] FLY-TYING VISE

[76] Inventor: Efton T. Carter, 480 N. Peach St., Stayton, Oreg. 97383

[21] Appl. No.: 1,700

[22] Filed: Jan. 8, 1979

[51] Int. Cl.³ .............................................. B25B 1/04
[52] U.S. Cl. ...................................... 269/71; 269/97; 269/238
[58] Field of Search ................... 269/71, 239, 97, 238, 269/246

[56] References Cited

U.S. PATENT DOCUMENTS

| | | | |
|---|---|---|---|
| 2,489,547 | 11/1949 | Temple | 269/71 |
| 2,569,424 | 9/1951 | Mayhew et al. | 269/97 |
| 2,886,080 | 5/1959 | Rappeport | 269/239 |
| 4,119,305 | 10/1978 | Anderson | 269/71 |

*Primary Examiner*—Robert C. Watson
*Attorney, Agent, or Firm*—Michael A. Painter

[57] ABSTRACT

A vise for holding a fish hook during the operation of tying a fly thereon. A shaft is secured to a stable surface, the shaft having an upper coupling integral therewith. A base head is pivotally secured to the shaft coupling, the base head having a threaded aperture disposed therethrough adapted to receive a rotatable bolt therein. The rotatable bolt extends through the base head and is secured to an intermediate housing. The intermediate housing is rotatable in a 360° arc with respect to an axis through the base head. A vise assembly is pivotally coupled to the opposite end of the intermediate housing. The vise assembly is adjustable at both the forward and rearward section of the jaws permitting the mounting of very small fish hooks. The vise assembly, intermediate housing and base head provide for three-dimensional movement of the mounted fish hook to facilitate the tying of flies thereon.

1 Claim, 5 Drawing Figures

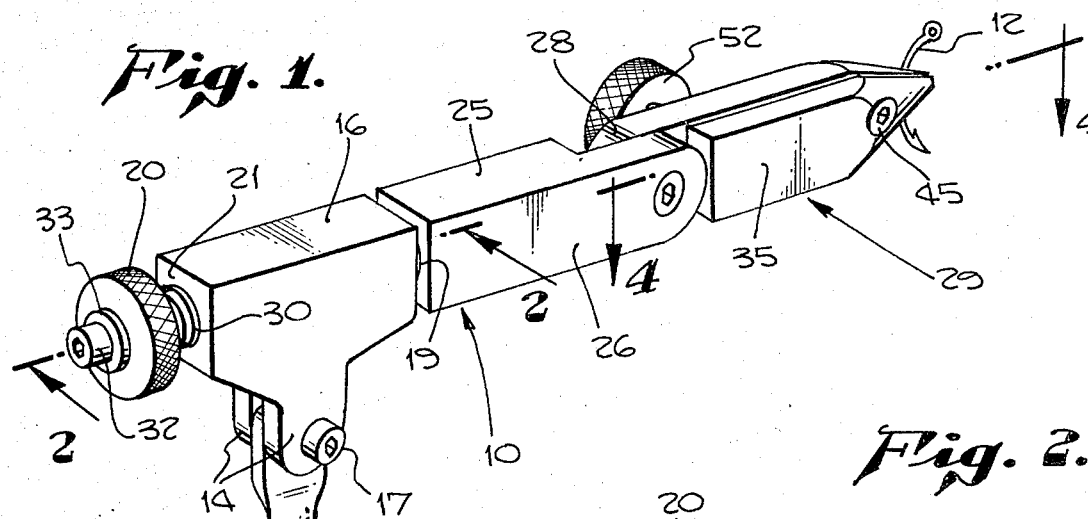
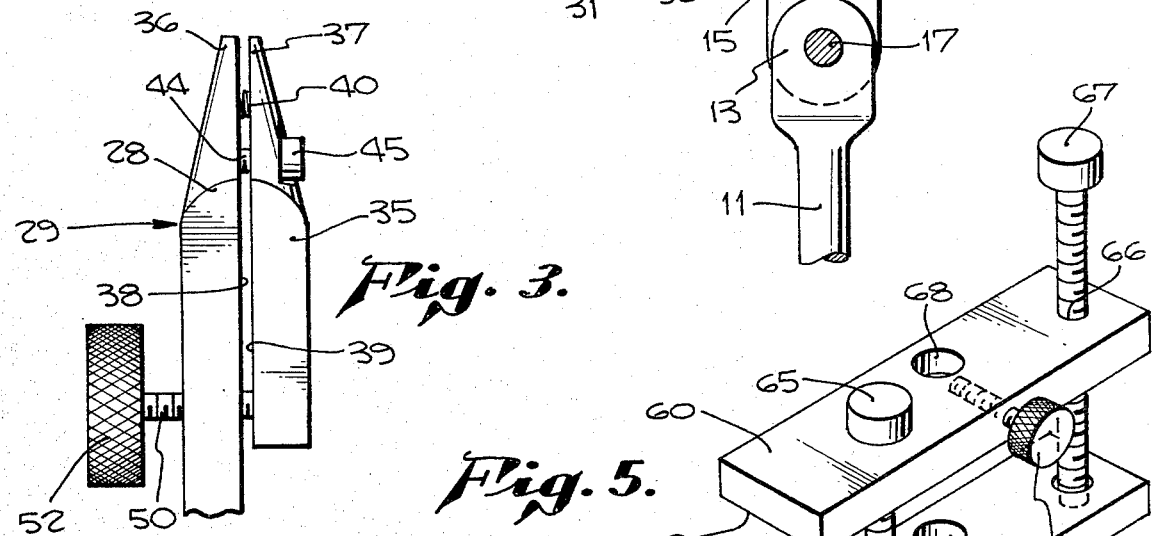
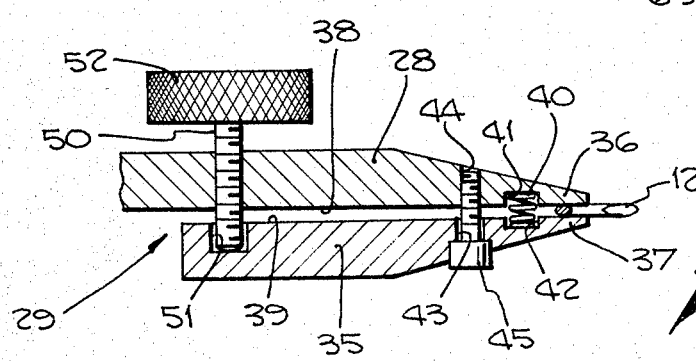

FLY-TYING VISE

BACKGROUND OF THE INVENTION

1. Field of the Invention

The present invention generally relates to clamps, and more particularly, to those clamping devices used to hold fish hooks during the operation of tying flies thereon.

2. Prior Art

The prior art discloses a number of supporting clamps or like devices which can be used for the mounting of a fish hook during the operation of tying a fly thereon. The inadequacies of the devices disclosed by the prior art can generally be classified into two categories: (1) those which exhibit a limited fieled of movement during the fly-tying operation; and (2) apparatus which employ a hook-mounting vise which is limited in the size of the fish hook which can be held.

U.S. Pat. No. 2,586,636 is typical of category (1) designated hereinabove. In this patent, the hook is held within a collet member which is confined within a sleeve. The collet member can be tightened within the sleeve to hold a fish hook by the top of the shank thereof. The collet member can be rotated 360° and clamped by a lock screw. The manner in which the hook is held, as well as the limitation in the degree of freedom within which the hook can be rotated are severe, inherent limitations in the device taught by this patent.

The device taught by U.S. Pat. No. 2,642,767 also falls within the first category defined hereinabove. A rod which is clamped to a fixed surface is pivotally coupled to a second rod which is terminated by an assembly which is intended to hold a fish hook. Only two degrees of freedom are permitted by this device since the hook holding member can rotate only about the axis of the second rod. In addition, the manner in which the hook is held severly limits the manner in which a fly can be tied thereon.

U.S. Pat. No. 2,486,142 is typical of those devices defined by the second class listed hereinabove. The vise which is used to hold the hook is of a one-piece construction and uses longitudinal spring jaws which are controlled by a single clamping screw. As a result of the use of only a single clamping adjustment, the jaws will always define an angular opening therebetween as opposed to having a pair of jaws which can be oriented in parallel relation to each other. As will be discussed hereinbelow, the inadequate structure of the devices disclosed by the prior art severely limit the size of the hooks which can be mounted therein.

U.S. Pat. No. 2,569,424 also exhibits a device which is defined by category (2) identified hereinabove. Aside from the restrictive nature of the positioning movement, this patent defines a vise which is similar to that described hereinabove. The two portions of the vise have a pivoting mechanism intermediate the portion of the jaws adapted to hold the hook and a cam mechanism which is used to open or close the jaws. Forward of the pivot is a resilient member which is used to apply outwardly directed torque against the jaw opening. An eccentric cam is located on the opposite side of the pivot thereby producing a reciprocal movement of the jaw opening which will be opposed by the resilient member. An inherent flaw in the operation of this device is the inability to produce jaw openings which will be parallel to each other. This is essential if the device is to be able to be used with large as well as the tiny hooks which are used for tying fishing flies.

The present invention substantially resolves the mechanical inadequacies which are disclosed by the prior art. The fly-tying vise taught by the present invention utilizes a base head, intermediate housing and vise assembly which provide for substantially free movement of the hook along a substantially unlimited spherical surface defined about a point where the apparatus is secured to a fixed medium such as a table, etc. The vise assembly used to position the hook while tying the fly thereon has both forward and rearward adjustment points which will permit the interior faces of the vise to be positioned parallel to each other. Since this is the only way it can be assured that a small hook will not be inadvertently dislodged, this presents a substantial improvement over the devices taught by the prior art.

SUMMARY OF THE INVENTION

The present invention comprises a vise which is primarily used for the mounting of fish hooks while tying flies thereon. Although the present invention can be utilized to mount numerous objects while performing selected operations thereon, the following discussion shall describe the present invention in terms of its primary application.

A shaft is vertically mounted upon a secure platform through the use of a clamping assembly or through the use of mounting threads. The upper portion of the shaft has an aperture disposed therethrough for rotatably mounting the base head which will rotate in a plane which includes the supporting shaft. The base head has a threaded aperture therethrough which lies in its positioning plane. A threaded member is disposed therethrough, a locking knob being positioned at one end thereof to limit the movement of the threaded member through the aperture, the oppositie end thereof being secured to an intermediate housing. Coupled to the intermediate housing opposite the threaded member is the vise assembly. The vise assembly is pivotable about a plane which is substantially co-planar to that created by the base head about the supporting shaft. The vise assembly comprises a jaw implemented through the use of a pair of complementary jaw members. A pair of threaded shafts are disposed through a single jaw member and threaded into the complementary member. In this manner, a hook as small as a No. 32 or as large as an 8/0 can be held in the forward section of the vise assembly for the purpose of tying flies thereon.

It is therefore an object of the present invention to provide an improved fly-tying vise.

It is another object of the present invention to provide a fly-tying vise which has concentric, spherical degrees of movement about a fixed point.

It is still yet another object of the present invention to provide a fly-tying vise incorporating an improved jaw assembly.

It is still yet another object of the present invention to provide an improved fly-tying vise which is simple and inexpensive to fabricate.

The novel features which are believed to be characteristic of the invention, both as to its organization and method of operation, together with further objectives and advangtages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 1 is a perspective view of a fly-tying vise in accordance with the present invention.

FIG. 2 is a partial, cross-sectional view of the base head taken through line 2—2 of FIG. 1.

FIG. 3 is a top plan view of the vise assembly shown in FIG. 1.

FIG. 4 is a cross-sectional view of the vise assembly shown in FIG. 1 taken through line 4—4 of FIG. 1.

FIG. 5 is a form of the clamp to be used to hold the fly-tying vise shown in FIG. 1.

DESCRIPTION OF THE PRESENTLY PREFERRED EMBODIMENT

An understanding of the present invention fly-tying vise can be best gained by reference to FIG. 1 wherein a perspective view of the present invention is shown, the fly-tying vise being generally designated by the reference numeral 10. A shaft 11 is secured to a stable surface by threading an end of shaft 11 or through the use of a clamp such as that which will be described in connection with FIG. 5. As stated hereinabove, the present invention fly-tying vise 10 can position a fish hook 12 through a substantially unlimited set of concentric spheres which are defined about shaft 11. This provides for total flexibility with regard to the positioning of hook 12 irrespective where the user desires to position same. The upper terminus 13 of shaft 11 is tapered into a pair of parallel surfaces which is disposed intermediate flanges 14 and 15 of base head 16. In order to permit base head 16 to move through 180° of arc in a plane which includes shaft 11, an aperture is disposed through flange 14 and a mating, threaded aperture is disposed into flange 15. A threaded bolt 17 is disposed through the aperture in flange 14 and mated with the threads of the aperture in flange 15. The rotational drag between based head 16 and upper terminus 13 will be determined by the positioning of bolt 17.

Uniform aperture 18 is disposed through base head 16, at least a portion thereof being impressed with a uniform spiral screw thread. Threaded shaft 19 is disposed through aperture 18, the threaded portion of shaft 19 being mated to the internal threads of aperture 18. If threaded shaft 19 is to be locked in an adjustable, but fixed position, locking knob 20 is disposed about one end of shaft 19 and is adapted to bear against surface 21 of base head 16. As will be explained hereinbelow, shaft 19 is rotatable about the axis of aperture 18, the positioning of knob 20 against surface 21 being capable of setting appropriate rotational drag or a locked position of shaft 19. The end of shaft 19 opposite knob 20 is secured to intermediate housing 25. Housing 25 is a substantially rectangular unit being joined to shaft 19 along the axis thereof. The end of housing 25 opposite that secured to shaft 19 is extended into a flange 26. An aperture is extended through flange 26 perpendicular to shaft 19, locking bolt 27 being disposed through the aperture and threaded into vise member 28 in a manner which will be described hereinbelow. The combination of the movement of base head 16 about threaded bolt 17, the rotation of intermediate housing 25 about the axis of shaft 19, and the movement of vise head assembly 29 about locking bolt 27 meets the objective of the present invention in regard to the positioning of hook 12. By appropriately positioning shaft 11, hook 12 can be moved through a substantially unlimited series of spherical surfaces formed about the coupling between base head 16 and the upper terminus 13 of shaft 11. Each positional coupling is independently adjustable thereby providing for three spacial degrees of movement for the secured hook 12.

A preferred form of the present invention utilizes a modified form for shaft 19 and incorporates the use of helical spring 30 intermediate locking knob 20 and surface 21. The insertion of spring 30 intermediate knob 20 and surface 21 will establish the rotational drag associated with the rotation of shaft 19. By disposing a threaded aperture 31 into the base of shaft 19, knob 20 can be locked in place. By inserting threaded bolt 32 through washer 33 into threaded aperture 31, a locking force can be imposed against knob 20. Knob 20 will be positioned against the resilient force of helical spring 30 thereby setting the selected rotational drag upon shaft 19.

A primary advantage over the prior art arises through the construction of vise assembly 29. As can be best seen by reference to FIG. 3 and FIG. 4, vise assembly 29 comprises vise members 28 and 35. The end portions 36 and 37 of vise members 28 and 35 respectively create the jaw within which to hold hook 12 during the fly-tying operation. The interior surfaces 38 and 39 of vise members 28 and 35 respectively are substantially flat, co-planar surfaces. Helical spring 40 is anchored within depressions 41 and 42 in surfaces 38 and 39 respectively. Vise member 35 has an aperture 43 disposed therethrough perpendicular to surface 39. Threaded aperture 44 is perpendicularly disposed into surface 38 and is adapted to be aligned with complementary aperture 43. Threaded bolt 45 is disposed through aperture 43 and threaded into aperture 44.

The ability to provide accurate positioning of a hook 12 arises through the utilization of the second adjustment for vise assembly 29. A threaded aperture 50 is disposed through vise member 28, a complementary unthreaded aperture 51 being disposed perpendicular to surface 39 into vise member 35. In operation, hook 12 is disposed between the jaws created by end portions 36 and 37 and adjustment bolt 45 tightened until it opposes the force of spring 40 in a sufficient manner to clamp hook 12 between the opposed surfaces 38 and 39. Since aperture 51 is unthreaded, the rotation of knob 52 will permit surfaces 38 and 39 to be placed parallel to each other in a manner which will allow the mounting of hooks which vary in size from No. 32 to 8/0.

Although the present invention can be incorporated with a variety of standard clamping devices, a preferred form of the clamp is shown in FIG. 5. The clamp comprises clamping plates 60 and 61. A stable surface such as a table top is disposed between surfaces 62 and 63 of clamping plates 60 and 61 respectively. A threaded aperture 64 is disposed into clamping plate 61, a complementary unthreaded aperture being disposed through clamping plate 60. Clamping bolt 65 is disposed through the unthreaded aperture in clamping plate 60 and threaded through aperture 64 in clamping plate 61. In a complementary manner, a threaded aperture 66 is disposed through clamping plate 60 for receipt of a second clamping bolt 67. An unthreaded depression is partially disposed into clamping plate 61 for receiving the end of clamping bolt 67. In order to anchor a clamp in place, clamping plates 60 and 61 are disposed about the holding surface and clamping bolt 65 rotated until a snug coupling is created. Clamping bolt 67 is then rotated causing a secure coupling for the clamp. Unthreaded apertures 68 and 69 are disposed through clamping plate 60 and 61 intermediate the position for clamping bolts 65 and 67. Shaft 11 is positioned through apertures 68 and 69 and held in place through the use of set screw 70. The rotation of shaft 11 will be permitted by loosening set screw 70, the remaining degrees of movement for hook 12 being performed through the appropriate adjustment of threaded bolt 17, knob 20 and locking bolt 27.

It can therefore be seen that the present invention provides an improved fly-tying vise. The fish hook which is being mounted for the purpose of tying a fly thereon can be rotated through a series of concentric spheres which are positioned about securing shafts. The vise assembly utilized to hold the hook provides an additional adjustment which will permit the jaws of the vise assembly to be disposed parallel to each other and thereby permit the use of same for very small hooks. It can therefore be seen that the inherent problems associated with the devices taught by the prior art have been overcome by the present invention.

I claim:

1. A fly-tying vise for securing a fish hook comprising:
   (a) a supporting shaft;
   (b) a base head pivotally coupled to said supporting shaft, said base head having a screw threaded aperture disposed therethrough perpendicular to the pivotal coupling between said base head and supporting shaft;
   (c) a threaded bolt removeably and rotatably disposed within and engaged with the screw threaded aperture, said threaded bolt having first and second ends extended beyond the respective ends of said screw-threaded aperture;
   (d) an intermediate housing being secured to the second end of said threaded bolt, said intermediate housing having a depending flange opposite said threaded bolt, said flange having an aperture disposed therethrough perpendicular to said threaded bolt;
   (e) a helical spring disposed about the first end of said threaded bolt;
   (f) a knob having a threaded aperture therethrough adapted to be disposed about and rotatably engaged with the first end of said threaded bolt, said knob being rotatably mounted upon the first end of said threaded bolt whereby said helical spring is resiliently compressed intermediate said knob and said base head;
   (g) a vise assembly having first and second jaw members each having a complementary planar surface adapted to be adjacent one another, said first jaw member being pivotally coupled through the aperture in the depending flange of said intermediate housing;
   (h) a resilient member disposed between the planar surfaces of said first and second jaw member whereby a forward opening is provided intermediate said planar surfaces for securing the fish hook therebetween;
   (i) first and second threaded coupling means for adjusting the distance between a forward opening between the planar surfaces, said first and second threaded coupling means being adjustably coupled intermediate said first and second jaw members between said flange and said resilient member whereby the planar surfaces can be maintained in a parallel orientation when the fish hook is secured within the vise assembly; and
   (j) a clamping apparatus comprising:
      (1) first and second planar members each having top and bottom surfaces, the bottom surface of said first planar member and the top surface of said second planar member being adapted to be in parallel spaced relation to each other whereby a fixed medium is clamped between a portion thereof, said first planar member having first and second apertures therethrough, said second aperture having screw-threads impressed about the circumference thereof, said second planar member having a first aperture therethrough adapted to be aligned with the first aperture of the first planar member and having screw-threads impressed about the circumference thereof, and a depression disposed in the top surface of said second planar member adapted to be aligned with the second aperture through said first planar member, said first and second members including aligned openings therethrough intermediate the first and second apertures of said first planar member and the first aperture and the depression in said second planar member;
      (2) locking means for securing the shaft within the openings through said first and second planar members; and
      (3) screw-threaded bolts removeably and rotatably mounted between the first and second planar members.

* * * * *